US007190777B2

(12) United States Patent
Urban et al.

(10) Patent No.: US 7,190,777 B2
(45) Date of Patent: *Mar. 13, 2007

(54) METHOD AND SYSTEM FOR PROVIDING CALLING NAME IDENTIFICATION REQUERY

(75) Inventors: Ron Urban, Woodridge, IL (US); Jim Kovarik, Batavia, IL (US); Bill Wojtczak, Lockport, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/253,293

(22) Filed: Oct. 18, 2005

(65) Prior Publication Data

US 2006/0078104 A1    Apr. 13, 2006

Related U.S. Application Data

(63) Continuation of application No. 10/389,227, filed on Mar. 13, 2003, now Pat. No. 6,975,716, which is a continuation of application No. 09/864,081, filed on May 23, 2001, now Pat. No. 6,560,324, which is a continuation of application No. 09/393,763, filed on Sep. 10, 1999, now Pat. No. 6,275,576, which is a continuation of application No. 08/757,893, filed on Nov. 27, 1996, now Pat. No. 5,974,128.

(51) Int. Cl.
*H04M 3/42* (2006.01)
*H04M 1/57* (2006.01)
*H04M 7/00* (2006.01)
*H04M 15/06* (2006.01)

(52) U.S. Cl. ................ 379/207.02; 379/127.01; 379/142.06; 379/221.09; 379/230

(58) Field of Classification Search ........... 379/127.01, 379/142.01, 142.06, 201.01, 207.02, 220.01, 379/221.08, 221.09, 230
See application file for complete search history.

(56) References Cited

U.S. PATENT DOCUMENTS

| 5,425,090 | A | 6/1995 | Orriss |
| 5,430,719 | A | 7/1995 | Weisser, Jr. |
| 5,438,568 | A | 8/1995 | Weisser, Jr. |
| 5,479,495 | A | 12/1995 | Blumhardt |
| 5,499,290 | A | 3/1996 | Koster |
| 5,517,562 | A | 5/1996 | McConnell |
| 5,519,772 | A | 5/1996 | Akman et al. |
| 5,526,413 | A | 6/1996 | Cheston, III et al. |
| 5,566,235 | A | 10/1996 | Hetz |

(Continued)

*Primary Examiner*—Harry S. Hong
(74) *Attorney, Agent, or Firm*—Brinks Hofer Gilson & Lione

(57) ABSTRACT

A method for determining the name of a calling party where the calling party's name and corresponding telephone number are found in a remote database. The method first identifies whether the calling party's telephone number is contained within the local database. When it is determined that the telephone number is not within the local database, the method attempts to locate the telephone number in a remote database. A query is formed according to a basic signal transmission protocol to ensure that a database which receives the query will be able to respond to it. The query requesting the name associated with the telephone number is sent across a network. The method receives a response to the inquiry and checks to ensure that a name was returned to the local database before delivering the name to the called party.

20 Claims, 2 Drawing Sheets

U.S. PATENT DOCUMENTS

| | | |
|---|---|---|
| 5,572,583 A | 11/1996 | Wheeler, Jr. et al. |
| 5,708,702 A | 1/1998 | De Paul et al. |
| 5,729,592 A | 3/1998 | Frech et al. |
| 5,974,128 A | 10/1999 | Urban et al. |
| 6,275,576 B1 | 8/2001 | Urban et al. |
| 6,560,244 B1 | 5/2003 | Huber |
| 6,975,716 B2 | 12/2005 | Urban et al. |

METHOD AND SYSTEM FOR PROVIDING CALLING NAME IDENTIFICATION REQUERY

CROSS-REFERENCE TO RELATED APPLICATIONS

This application is a continuation of U.S. patent application Ser. No. 10/389,227, filed Mar. 13, 2003 now U.S. Pat. No. 6,975,716, which is a continuation of U.S. patent application Ser. No. 09/864,081, filed May 23, 2001 (now U.S. Pat. No. 6,560,324), which is a continuation of U.S. patent application Ser. No. 09/393,763, filed Sep. 10, 1999 (now U.S. Pat. No. 6,275,576), which is a continuation of U.S. patent application Ser. No. 08/757,893, filed Nov. 27, 1996 (now U.S. Pat. No. 5,974,128), each of which is hereby incorporated by reference.

This invention relates generally to telephone services and more specifically to enhanced caller identification services.

BACKGROUND OF THE INVENTION

Local telephone service providers offer a variety of optional services to their customers. The services can be broadly categorized as originating services and terminating services. Originating services are controlled by the originating or calling party's central office when the calling party places a call. In comparison, terminating services are controlled by the terminating or called party's central office when an attempt to terminate a call occurs.

One example of a terminating service is "caller identification." Caller identification provides the called party with the name and telephone number of the calling party. Caller identification is typically provided to a subscriber by its local central office. In particular, each central office ordinarily has access to a local database containing telephone numbers and the corresponding names of people within its local area. Prior to terminating a call to the called party, the central office searches its database for the telephone number of the calling party. If the telephone number is found within the database, the name corresponding to that number will be accessed and are delivered to the called party by the central office.

If the telephone number and name are not within the database, the service cannot provide a name to the called party. When a service cannot identify a name corresponding to the number, it typically delivers a message indicating that the calling party's name is unavailable. Accordingly, a local database containing only a small quantity of numbers and corresponding names will generate a large number of "unavailable" messages.

An indication of unavailability provides the customer with no information about who is calling or where the call originated from. This is an undesirable result for a customer who is paying for a service that is designed to provide them with information about the person who is calling them.

The present embodiment of the invention addresses the problem of providing no information regarding a calling party when the called party's local database does not contain information about the calling party. The present embodiment provides for access to remote databases containing telephone numbers and corresponding names which are not contained in a local database. This results in a larger quantity of telephone numbers and corresponding names to search in an attempt to identify a calling party. In turn, there are fewer instances where the service is forced to provide a customer with an "unavailable" caller name message.

DESCRIPTION OF THE PRESENTLY PREFERRED EMBODIMENT

Figure 1:
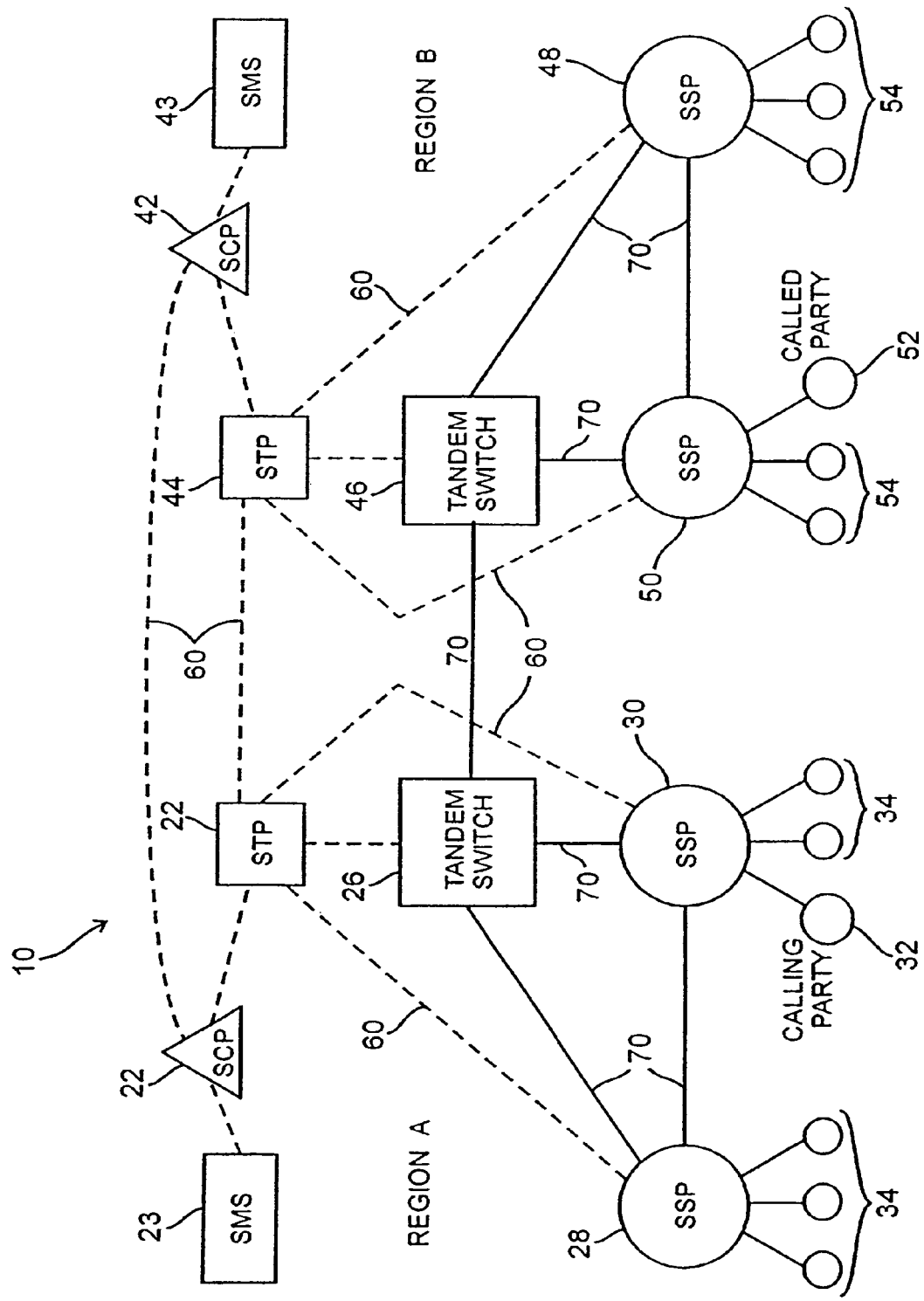
FIG. 1 is a block diagram of a telephone network system.

FIG. 1 shows a modern telephone network 10. Such a telephone network may have network elements including signal switching points (SSP) 28, 30, 48, 50, signal transfer points (STP) 24, 44, tandem switches 26, 46 and service control points (SCP) 22, 42. These elements typically transfer network signaling protocols 60 and voice and data traffic 70 between one another.

For example, SSPs 28, 30, 48, 50 and tandem switches 26, 46 typically transfer voice and data traffic 70. SSPs 28, 30, 48, 50 also communicate with STPs 24, 44 to transfer network signaling protocols 60, such as those defined by Signaling System 7, which is well known in the art, to control the network switching of voice and data traffic 70.

Preferably, subscribers 34, 54 gain access to the network through the SSPs 28, 30, 48, 50. A SSP is similar to a local telephone central office equipped with a voice switch such as an AT&T #5 ESS or a Nortel DMS-100, well known to those skilled in the art. Central offices equipped with software implementing advanced intelligent network (AIN) features are designated as SSPs.

As shown in FIG. 1, the telephone network may be divided into regions, such as region A and region B. Each region may include several central offices or SSPs. For example, SSPs 28, 30 within region A send and receive network signaling protocols 60 to and from STP 24 which services region A. SSPs 28, 30 within region A send voice and data traffic 70 to and from tandem switch 26 located within region A, as well as other SSPs 44 in region A.

Tandem switches 26, 46, STPs 24, 44 and SCPs 22, 42 typically provide voice and data traffic 70 and network signaling protocols 60 between customers in different geographic areas. For example, tandem switches 26, 46 transfer voice and data traffic 70 between regions. Tandem switches such as AIT No. 4 ESS and Northern Telecom DMS 100 are well known in the art. In addition to the tandem connection, it should be understood that SSPs in different areas may also transfer voice and data traffic directly between each other.

STPs 24, 44 communicate with SCPs 22, 42 to transfer network signaling protocols 60. STPs 24, 44 also transfer network signaling protocols 60 between regions. SCPs 22, 42 may also transfer network signaling protocols between region A and region B via STPs 24, 44. A STP and a SCP preferably include a microprocessor controlled computer system using computer peripherals controlled by application software programmed to implement the appropriate communication functions. STPs and SCPs are available from a number of telephone switch venders such as AT&T (Lucent Technologies), Nortel, and Siemens, for example.

Referring again to FIG. 1, the process of identifying the name of a calling party 32 in the preferred embodiment begins when the calling party 32 lifts the telephone receiver and sends the number of the called party 52 to the SSP 28. The SSP 28 of calling party 32 sends a network signaling protocol 60 to STP 24 which routes the network signaling protocol signal 60 to the SSP 50 of the called party 52. The network signaling protocol 60 alerts the called party's SSP 50 that the calling party 32 is attempting to terminate a call to the called party 52.

In the AIN of the present embodiment, central databases 23, 43 at SCPs 22, 42 store information identifying the types of terminating services available to a subscriber 34, 54. This information determines how SCPs 23, 43 will handle queries sent from the called party's SSP 50.

When the called party's SSP 50 attempts to terminate the call, SSP 50 triggers a query to its SCP 42 via STP 44. In particular, SSP 50 sends the query over the signaling network via STP 44 to SCP 42 as it would send a network signaling protocol 60. The query preferably contains the 10 digit telephone number of calling party 32. Preferably, SSP 50 has software with an associated computer processor and memory which recognizes the network signaling protocol identifying an incoming call attempt. In response, SSP 50 software formulates the trigger query and transmits it to STP 44 as it would a network signal protocol message.

The triggered query requests SCP database 43 to identify the terminating services available to the called party 52. For example, SCP database 43 may contain information identifying the terminating services available for each telephone number in the form of a database or lookup table in a memory storage device such as random access memory, or a magnetic or optical disk drive, known to those skilled in the art. Of course, a combination of different memory storage devices or other types of devices may be used. The memory storage device preferably stores the service information in a data record such as an array, lookup or pointer table or other data structure known to those skilled in the art. Upon receiving the triggered query, SCP 42 preferably indexes the called party's telephone number into SCP database 43 to obtain the information regarding the services available to the called party 52. If caller identification is available, SCP 42 will attempt to determine the name of the calling party 32. In the preferred embodiment, the trigger query contains the calling party's 10 digit telephone number.

Figure 2:
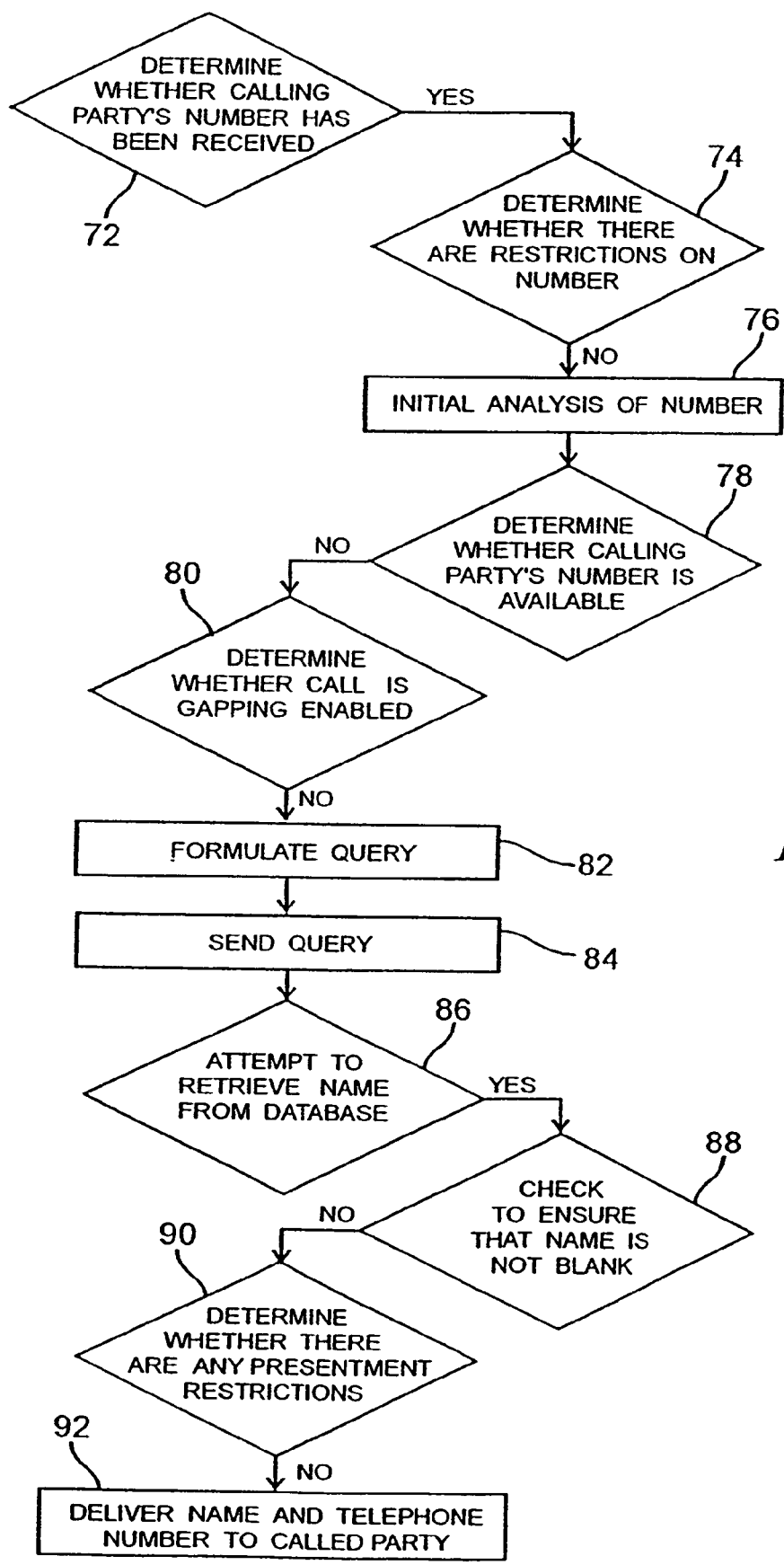
FIG. 2 is a flow chart of the method of the present invention utilized in the telephone network of FIG. 1.

Referring now to FIG. 2, SCP 42 (FIG. 1) determines 72 whether the calling party's telephone number has been received. If the telephone number has been received, SCP 42 determines 74 whether the calling party 32 has placed any restrictions on the disclosure of his name by requesting that it not be disclosed. If there are no restrictions, SCP 42 performs 76 an initial analysis of the calling party's ten digit telephone number. Preferably, SCP 42 analyzes the first six digits of the telephone number to determine whether the calling party name is within SCP database 43. The first six digits of a ten digit telephone number are typically referred to as a NPANXX combination. For example, a NPANXX contains an area code and prefix such as 312–321. Alternatively, SCP 42 may analyze the first three digits of the calling party's telephone number to determine whether a calling party is within database 43.

Preferably, SCP 42 analyzes the NPANXX by searching database 43 containing all of the combinations of the NPANXX of all the phone numbers available within the database. If NPANXX of the calling party's telephone number is found within the database, then the calling party name is available and can be determined by matching the last 4 digits of the calling party number.

However, in some instances, the combination of the first six digits of the calling party's telephone number is identified as not being listed within the local database 43. This may occur, for example, if the name of the calling party cannot be determined, the calling party 32 and the called party 52 are typically from different calling regions serviced by different SCPs which do not share name and number information. Rather than providing the called party 52 no information regarding the calling party 32, the current embodiment will access remote databases in an attempt to identify the calling party 32.

Referring now to FIG. 2 the method of the current embodiment is initiated after local SCP 42 (FIG. 1) searches 76 a local database 43 for the combination of the first six digits of the calling party's telephone number to determine whether that combination is listed within local SCP database 43. If SCP 42 determines 78 that the calling party's telephone number is not listed within local database 43, SCP 42 identifies which remote SCP 22 is likely to contain the calling party's telephone number. SCP 42 also determines 80 whether the call is gapping enabled such that remote SCP 22 cannot handle the impending query. Provided that the call is not gapping enabled, local SCP 42 will formulate 82 an appropriate query based upon TR1188 protocol. TR1188 protocol is chosen as a default protocol because it is assumed that any SCP will be able to respond to an appropriate query that is formulated according to the TR1188 protocol.

After the proper query is formulated, it is sent 84 by local SCP 42 to remote SCP 22 according to TR1188 protocol. The query can be sent over the network as a point code in order to increase the chances of finding the name corresponding to the calling party's number. When remote SCP 22 receives the query, remote SCP 22 searches its database 23 for the combination of the first six-digits of the calling party. If SCP 22 finds 86 the combination within the database 23, SCP 22 retrieves the corresponding name and delivers the name and telephone number in the form of a response. The response is sent from remote SCP 22 to local SCP 42. Local SCP 42 checks 88 to ensure that a name was received by analyzing the response and determining that the name is not blank. If the name is not blank, SCP 42 determines 90 whether there are any restrictions on presenting the found name. If there are no restrictions on presentment, SCP 42 delivers 92 the telephone number and corresponding name to the SSP 50 of the called party 52.

The present embodiment may be implemented with software and logic as known to those of skill in the art. For example, the present embodiment may be written in a high level programming language such as Pascal, C or C++. The present embodiment may be written and compiled to run on a standard UNIX operating system microcomputer implemented within the SCP.

It is to be understood that foregoing detailed description is exemplary and explanatory and is intended to provide further explanation of the invention as claimed. Numerous modifications and variations are possible. The invention, together with the further objects and intended advantages, will best be understood by reference to the following detailed description, taken in conjunction with the accompanying drawings.

We claim:

1. A method of identifying a name that corresponds to a telephone number, the method comprising:
   receiving a first query;
   formulating a second query that requests a name that corresponds to a telephone number; and
   transmitting the second query to a remote location after determining the remote location is able to process the second query.

2. The method of claim 1, wherein the first query includes the telephone number.

3. The method of claim 1, wherein the second query includes the telephone number.

4. The method of claim 1, wherein the remote location comprises a service control point.

5. The method of claim 1, wherein receiving a first query comprises receiving a first query from a service switching point.

6. The method of claim 1, wherein formulating a second query that requests a name that corresponds to a telephone number comprises formulating a second query in accordance with a TR1188 signaling protocol.

7. The method of claim 1, wherein formulating a second query that requests a name that corresponds to a telephone number comprises transmitting the second query in accordance with a TR1188 signaling protocol.

8. The method of claim 1, further comprising identifying the name that corresponds to the telephone number.

9. The method of claim 1, further comprising transmitting the name that corresponds to the telephone number from the remote location.

10. The method of claim 1, further comprising transmitting the name that corresponds to the telephone number to a called party.

11. A system for identifying a name corresponding to a telephone number, the system comprising:
    means for formulating a second query that requests a name that corresponds to a telephone number in response to the receipt of a first query;
    means for determining whether a remote location is able to process the second query; and
    means for transmitting the second query to the remote location.

12. The system of claim 11, further comprising means for transmitting the name that corresponds to the telephone number to a called party.

13. The system of claim 11, wherein the remote location comprises a service control point.

14. A computer usable medium having computer readable program code embodied therein for identifying a name that corresponds to a telephone number, the computer readable program code comprising:
    computer readable program code for causing a computer to formulate a second query that requests a name that corresponds to a telephone number in response to the receipt of a first query;
    computer readable program code for causing a computer to determine whether a remote location is able to process the second query; and
    computer readable program code for causing a computer to transmit the second query to the remote location.

15. The computer usable medium of claim 14, wherein the remote location includes computer readable program code for causing a computer to identify the name that corresponds to the telephone number.

16. The computer usable medium of claim 14, wherein the remote location includes computer readable program code for causing a computer to transmit the name that corresponds to the telephone number to another location.

17. The computer usable medium of claim 14, further comprising computer readable program code for causing a computer to transmit the name that corresponds to the telephone number to a called party.

18. The system of claim 11, wherein the remote location includes means for identifying the name that corresponds to the telephone number.

19. The system of claim 11, wherein the remote location includes means for transmitting the name that corresponds to the telephone number.

20. A system for identifying a name corresponding to a telephone number, the system comprising:
    means for formulating a second query that requests a name that corresponds to a telephone number in response to the receipt of a first query that is transmitted from a switch and requests the name that corresponds to the telephone number, where the second query is based upon information that was included in the first query; and
    means for transmitting the second query to a remote location, wherein the remote location includes means for transmitting the name that corresponds to the telephone number.

\* \* \* \* \*